United States Patent Office 2,938,576
Patented May 31, 1960

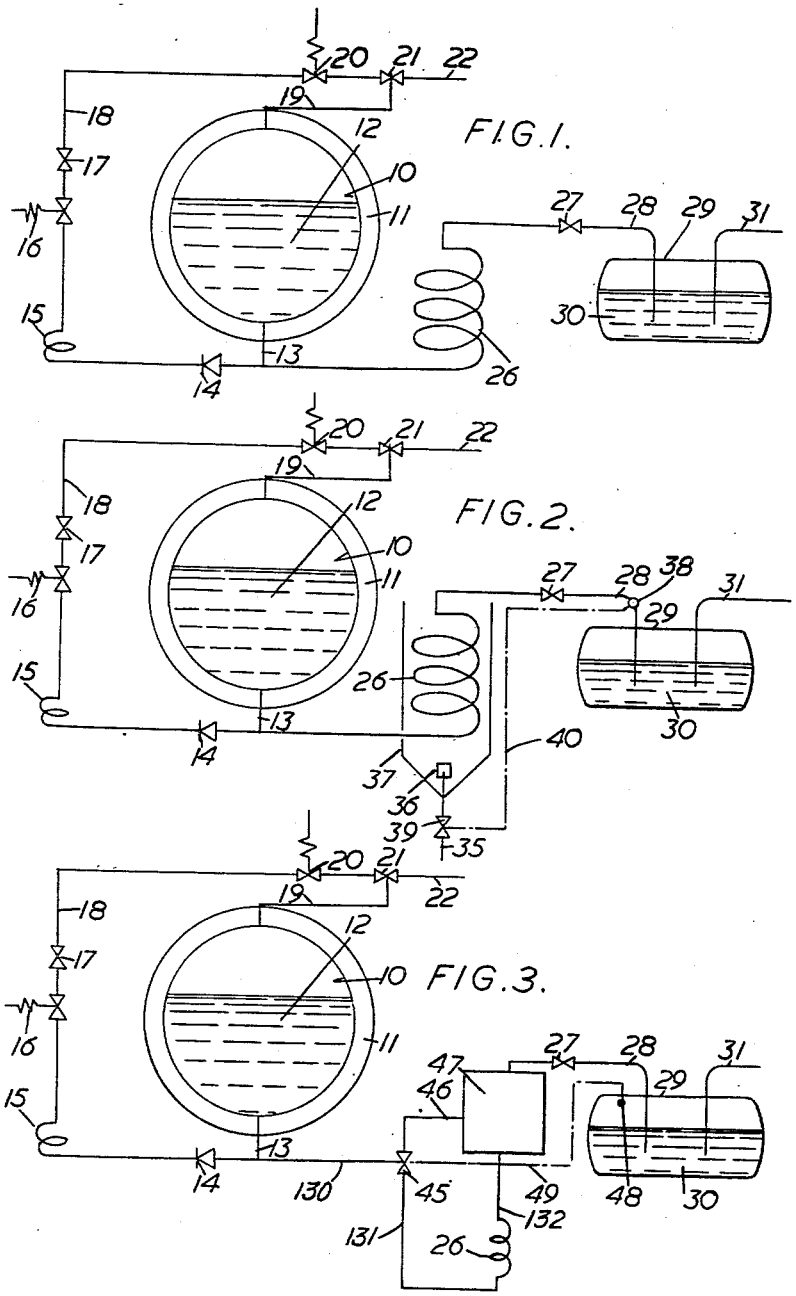

2,938,576

MEANS FOR SUPPLYING GASES TO THE FUEL SYSTEMS OF AIRCRAFT

Lawrence Alfred Cox, Theydon Bois, and Kenneth Cecil Smith, Barnes, London, England, assignors to The British Oxygen Company Limited, a British company Filed July 5, 1956, Ser. No. 595,895

Claims priority, application Great Britain July 7, 1955

2 Claims. (Cl. 158—36.5)

The present invention relates to methods of and means for supplying gases to the fuel systems of aircraft. The term "aircraft" as used herein is intended to cover all types of airborne craft including piston-operated, turbojet, jet propelled and rocket-powered aircraft.

There is a requirement for gas for ensuring that a positive pressure exists in the fuel systems of aircraft at all times despite rapid changes in altitude or flight position of the aircraft. It is of advantage to use an inert gas for this purpose because it also serves as a blanketing or purging medium reducing fire hazard. Where nitrogen has hitherto been employed, it has been the practice to provide the gas in high pressure containers at the pressure of about 2,000 p.s.i. or higher. The weight of such containers in relation to the gas content is, however, considerable, and it is an object of this invention to provide an arrangement for supplying gases to the fuel system of aircraft which not only avoids the use of such high pressure containers but also ensures the introduction of purging medium in the form of gas in the gaseous phase into the fuel tank of the aircraft at a desired temperature.

In connection with the foregoing object, it is a further object of the invention to provide an arrangement for supplying purging gas to the fuel tank of an aircraft at a desired temperature, and which arrangement includes means operative in response to the temperature condition of the delivered purging gas to control the heat of vaporization of the gas in the liquid phase in its passage from the supply container to the fuel tank of the aircraft.

Additionally, the rate of feed of gas will vary in accordance with the rate of consumption of fuel and may also vary with the pressure differential due to change in altitude. The supply of heat energy to the liquid gas and consequently the rate of vaporisation is preferably controlled automatically so as to maintain predetermined pressure conditions within the fuel system. The pressure differential between the pressure in the fuel system and the ambient pressure may be maintained at a substantially constant level at all altitudes or may be arranged to vary in accordance with a predetermined scale.

The heat energy for vaporising the gas in the liquid phase may be derived by passing the liquid through a coil heated by the atmosphere or electrically, or by combustion of a fuel gas or by other methods as mentioned hereafter. Heat energy is supplied under thermostatic control to ensure complete vaporisation of the gas in the liquid phase under all conditions of demand and the delivery of the gas in the gaseous phase to the fuel system at a temperature within predetermined desired limits. On the one hand, the temperature must not be so low as to cause a change in state of the fuel, such as a settling-out in the solid state of water or other solidifiable component; on the other hand, in cases where heating is provided by an electrical or fuel gas heater, the temperature must not be so high as to cause premature vaporisation of the fuel or damage to the fuel tank or the housing thereof.

It is a specific object of the invention to provide a purging system for the fuel tanks of aircraft which includes a container adapted to receive a supply of low temperature purging gas in the liquid phase, means for pressurizing the interior of the container without contaminating the gas in the liquid phase, gas conveying conduit means extending between the container and the fuel tank of the aircraft and heat energy supplying means operatively associated with the gas conveying conduit means for supplying heat to insure conversion of all gas in the liquid phase into purging gas in the gaseous phase and with this heat energy supplying means being controlled by control means that include means responsive to the temperature condition of the gas in the gaseous phase at a location downstream of the heat energy supplying means so that the delivered purging gas in the gaseous phase is at a desired temperature.

Further and more specific objects will be apparent from the following description taken in connection with the accompanying drawings in which:

Fig. 1 is a diagrammatic representation of one arrangement; and

Fig. 2 is a diagrammatic representation of an alternative arrangement.

Fig. 3 is a diagrammatic representation of a further alternative arrangement.

Referring to Fig. 1, a vessel 10 surrounded by suitable heat insulation 11, which may take the form of a vacuum insulated space, contains a mass of liquefied gas 12, such for instance as liquid nitrogen. Provision is made for drawing-off liquid from the bottom of the container 10 through a pipe 13 and a non-return valve 14, to an evaporating coil 15. From the evaporating coil 15, gas passes through a pressure relief valve 16, a pressure actuated valve 17 which closes when the pressure above atmospheric reaches a desired operating value, a pipe 18, a second pressure relief valve 20 and a manual cutoff valve 21 to the upper part of the container 10 through a pipe 19.

In operation, after the container 10 has been filled to a desired level, the manual cut-off valve 21 is operated to close a vent line 22 and connect the pipe 18 to the pipe 19. Gas in the liquid phase flows under gravity through the pipe 13 past non-return valve 14 to the evaporating coil 15, where it is evaporated and in the form of gas in the gaseous phase passes through valves 16, 17 and 20 and 21 and pipes 18 and 19, and is fed into the upper part of the container 10 to build up the pressure therein to a suitable value, determined by the settings of the pressure actuated valve 17 and the pressure relief valves 16 and 20.

After the container has been pressurized as above described, or by other suitable means such as gas under pressure, gas in the liquid phase can be allowed to flow via pipe 13 to a main evaporating coil 26 wherein it is connected to gas in the gaseous phase for delivery through a supply control valve 27 and a delivery pipe 28 into a fuel tank 29. The tank 29 contains liquid fuel 30, which can be delivered through a delivery pipe 31 either by the pressure exerted by the evaporated liquefied gas or by means of a pump not shown.

In this arrangement, as shown in Fig. 1, the heat supply for evaporating the liquefied gases in the evaporating coils 15 and 26 can be obtained from any convenient source. In some instances, sufficient heat may be obtained by disposing the evaporating coils in a convenient position surrounding or adjacent to the container 10, so that heat is obtained from the ambient air within a part of the aircraft. Alternatively, the main evaporating coil 26 may be so disposed in the aircraft that it is arranged to provide cooling for a part or parts of the aircraft which in operation become excessively warm or hot. For instance, the main evaporating coil 26 may be arranged to cool the pilot's cockpit or other accommodation for members of the crew of the aircraft or the fuel itself.

In very high speed aircraft where heat arising from atmospheric friction has to be dissipated, heat from such source may be utilised for effecting the required heating of the gas stream and thereby contribute to the problem of cabin or fuel cooling. In connection with fuel cooling, the nitrogen, after having been heated in accordance with the invention to vaporise the liquid but whilst still at a low temperature compared with the fuel may be bubbled through the fuel to effect the cooling thereof.

Figure 2 illustrates an arrangement in which the container 10 receives a supply of low temperature purging gas in the liquid phase. Similar to the arrangement of Figure 1, this form includes a first evaporator 15, conduit means 13 that extend between the container 10 at a level below the liquid level therein and the evaporator 15 and second conduit means 18, 19 extend from the evaporator 15 into communication with the interior of the container above the liquid level so that purging gas in the liquid phase can be evaporated in the evaporator 15 and delivered to the interior of container 10 to place a head of pressure on the mass 12 of purging gas in the liquid phase within the container without contaminating the purging gas. This pressurizing arrangement is the same as in the Figure 1 form and also includes a non-return valve 14 between the container and the evaporator 15, a pressure relief valve 16, a pressure actuated valve 17 which closes when the pressure reaches a desired operating value, a second pressure relief valve 20 and a control valve 21. The arrangement further includes a second evaporator 26 which constitutes the main evaporating coil. Heat energy is supplied to this second evaporator by heat energy supplying means 36 which comprise a liquid fuel burner receiving liquid fuel through a supply line 35. A muffle 37 surrounds the main evaporating coil 26. From the evaporator, the gas in the gaseous phase passes through conduit means 28 into the interior of the tank 30. A control valve 27 is interposed in the conduit means 28 between the evaporator and the fuel tank. The heat energy that is supplied to the gas in the liquid phase in the evaporator is controlled by control means including a valve 39 governing the supply of fuel to the burner and a thermo-responsive means 38 operatively interconnected by a suitable mechanical linkage or an electrical control denoted diagrammatically by the dot and dash line 40 with the valve 39. The thermo-responsive means 38 is responsive to the temperature condition of the gas in the gaseous phase at a location downstream of the heat energy supplying means 36 so as to regulate the amount of heat energy supplied to the gas in the gaseous phase to insure delivery of purging gas at a desired temperature.

It will be appreciated that as an alternative to the use of a fuel burner such as 36 for providing the heat input to the main evaporating coil 26, any other suitable means, such for instance as an electrical heater, can be provided as long as the heat energy supplied is controlled by means responsive to the temperature condition of the gas in the gaseous phase at a location downstream of the heat energy supplying means.

In jet-propelled aircraft, a jet pipe muff may be used as a heat exchanger for vaporising the liquid or heating the gas. Alternatively, a heat exchanger fed with hot air tapped from the engine compressor or jet pipe may be used. As a further alternative, the heat required may be derived from the oil cooling system of the aircraft or from the fuel system.

In the system disclosed in Figure 3 the component parts for pressurizing the interior of container 10 without contaminating the purging gas therein are the same as in Figures 1 and 2. In this form of the invention, however, a mixing chamber 47 is interposed in the conduit means between the gas container and the aircraft fuel tank 29. Thus, in Figure 3 the arrangement includes a second evaporator 26, conduit means 130, 131 and 46 which provide communication between the container 10 at a level below the liquid level therein and the second evaporator 26 and the mixing chamber 47 respectively. A thermostatically controlled flow metering valve means 45 is operatively associated with this further conduit means upstream of the mixing chamber and second evaporator so as to control the relative proportions of gas in the liquid phase delivered to the mixing chamber 47 and second evaporator 26 respectively. Still further conduit means 132 extend between the second evaporator and the mixing chamber whereby responsive to the position of the metering valve means, purging gas in the liquid phase can be delivered in one proportion directly from the container 10 to the mixing chamber 46 and in another proportion from the container 10 to the second evaporator 26 for conversion into gas in the gaseous phase. In this form of the invention, the proportion of gas in the liquid phase that goes through the evaporator 26 is subjected to heat energy supplied by suitable means, not shown, in an amount sufficient to elevate the temperature of the gas in the liquid phase to a level in excess of that required at the point of use, or in other words, above a desired final temperature. Thus, the gas in the gaseous phase flowing through conduit 132 enters the mixing chamber above this desired final temperature and converts all of the gas in the liquid phase that enters this chamber via pipe 46 into gas in the gaseous phase. The mixing chamber, therefore, in receiving gas in the gaseous phase at a superheated temperature is in effect a heat energy supplying means, that is in heat exchange relation with the gas in the liquid phase entering the mixing chamber via pipe 46.

In order to insure the delivery of gas in the gaseous phase at the desired final temperature, this arrangement includes a temperature responsive means, such as a thermostatic pickup of any well known type indicated at 48 in the fuel tank 29 and thus at a location downstream of the heat energy supplying means. Means 49 diagrammatically denote an operative connection, such as a mechanical linkage of any well known type between the temperature responsive means 48 and the flow metering valve 45. It would be appreciated that an electrical interconnection incorporating relays can be utilized to actuate the valve 45 in such a manner that, depending upon the conditions of demand, a suitable proportion of gas in the liquid phase is converted into gas in the gaseous phase and superheated in the evaporator 26 while the remaining proportion of gas in the liquid phase coming from the container 10 is fed directly into the mixing chamber 47 in the form of gas in the liquid phase. As stated above, the gas in the liquid phase flowing into the mixing chamber 47 via pipe 46 is contacted by the superheated gas in the gaseous phase to provide a volume of gas in the gaseous phase which is at a steady predetermined temperature governed by the actuation of the metering valve 45 in response to temperature responsive element 48. In other words, if the temperature of the purging gas being delivered via pipe 28 is too high, the valve 45 is actuated in a manner to supply a higher proportion of gas in the liquid phase to the mixing chamber and conversely when the temperature of the gas entering tank 29 is too low, the valve 45 is actuated to supply a higher proportion of gas in the liquid phase to the evaporator 26 for superheating so as to raise the temperature of the gas in the mixing chamber. This arrangement compensates for changes in aircraft altitude to ensure that the temperature of the purging gas entering the tank 29 is within a desired range.

The evaporator 26 may be heated in any suitable way, for instance by heat from one of the motors of the aircraft.

The container for the liquefied gas is preferably of a type which will ensure that liquid is expelled from the container in any attitude which the aircraft may assume in the course of its manoeuvres.

The gas under pressure may be employed for forcing fuel into the combustion zone as distinct from pressurising the actual fuel tank itself. Nitrogen vaporised in accordance with the invention may be used for this purpose and, in addition, oxygen also produced by vaporisation from liquid may be used for supplying the necessary oxidant to the combustion zone.

We claim:
1. In a fuel tank purging system for aircraft, a container adapted to receive a supply of low temperature purging gas in the liquid phase, means for pressurizing the interior of said container without contaminating said gas in the liquid phase, gas conveying conduit means extending between said container and the fuel tank of the aircraft and including an inlet communicating with the container below the liquid level therein, heat energy supplying means operatively associated with said gas conveying conduit means between said container and tank for supplying heat to convert the gas in the liquid phase into purging gas in the gaseous phase and control means for said heat energy supplying means including means responsive to the temperature condition of the gas in the gaseous phase at a location downstream of the heat energy supplying means for regulating the amount of heat energy that is supplied to insure a desired temperature of the delivered purging gas in the gaseous phase.

2. In a system for supplying a purging gas to the fuel tank of an aircraft, a container, adapted to be initially filled to a desired level with a volume of purging gas in the liquid phase, a first evaporator, conduit means extending between the container at a level below the liquid level therein and the first evaporator, second conduit means extending between the evaporator and the container and communicating with the interior thereof above the liquid level, whereby purging gas in the liquid phase is vaporized in the evaporator and delivered to the interior of the container for pressurizing the interior of the container to place a head of pressure on the purging gas in the liquid phase therein without contaminating the purging gas, a second evaporator between the container and the fuel tank, a purging gas accommodating mixing chamber between the second evaporator and the fuel tank, purging gas delivery conduit means extending between the mixing tank and the fuel tank, further conduit means providing communication between said container at a level below the liquid level therein and said second evaporator and mixing chamber respectively, a metering valve means operatively associated with said further conduit means upstream of said second evaporator and mixing chamber for controlling the relative proportions of gas in the liquid phase delivered to said mixing chamber and second evaporator respectively, still further conduit means extending between said second evaporator and the mixing chamber whereby responsive to the position of said metering valve means, purging gas in the liquid phase can be delivered in one proportion directly from said container to said mixing chamber and in another proportion from said container to said second evaporator for conversion into gas in the gaseous phase, said second evaporator being operative to supply sufficient heat to elevate the temperature of the gas in the gaseous phase delivered therefrom to the mixing chamber above a desired final temperature, a temperature responsive means within said fuel tank and means interconnecting said temperature responsive means with said metering valve means for controlling the position thereof in response to temperature conditions within the fuel tank, to insure that all of the gas in the liquid phase that enters the mixing chamber is converted to gas in the gaseous phase for delivery to the fuel tank at the desired temperature.

References Cited in the file of this patent
UNITED STATES PATENTS

| | | |
|---|---|---|
| 2,351,131 | Kerr | June 13, 1944 |
| 2,576,985 | Wildhack | Dec. 4, 1951 |
| 2,586,839 | Mapes | Feb. 26, 1952 |